United States Patent [19]

Wilson, Jr.

[11] 4,279,382

[45] Jul. 21, 1981

[54] RADIAL AND AXIAL FLOW VARIABLE EXHAUST NOZZLE FOR A GAS TURBINE ENGINE

[75] Inventor: Paul Wilson, Jr., Lake Park, Fla.

[73] Assignee: The United States of America as represented by the Secretary of the Air Force, Washington, D.C.

[21] Appl. No.: 115,847

[22] Filed: Jan. 28, 1980

[51] Int. Cl.³ .............................................. B05B 17/04
[52] U.S. Cl. .................................. 239/11; 239/265.25
[58] Field of Search ...................... 239/265.25, 265.33, 239/265.19, 265.11, 265.17, 11; 244/52, 23 R, 23 C; 60/228, 229, 230, 231

[56] References Cited

U.S. PATENT DOCUMENTS

| | | | |
|---|---|---|---|
| 2,641,104 | 6/1953 | Estabrook | 60/228 |
| 2,812,636 | 11/1957 | Kadosch et al. | 60/229 |
| 3,013,386 | 12/1961 | Meyer | 60/230 |
| 3,174,709 | 3/1965 | Alderson | 244/23 R |
| 3,409,250 | 11/1968 | Ammer et al. | 244/52 |
| 3,441,219 | 4/1969 | Turner | 239/265.33 X |
| 3,685,293 | 8/1972 | Shipman | 239/265.25 X |
| 3,982,696 | 9/1976 | Gordon | 239/265.17 |

*Primary Examiner*—Robert B. Reeves
*Assistant Examiner*—Gene A. Church
*Attorney, Agent, or Firm*—Donald J. Singer; Jacob N. Erlich

[57] ABSTRACT

Minimum thrust at idle speed, and maximum thrust with minimum losses at speeds above idle, are provided in a gas turbine engine by the use of a plurality of adjacent, successively overlapping, annularly disposed, pivotable, exhaust nozzle-forming fairings which are opened during idle to direct the exhaust gases overboard in radial directions between the opened fairings, and which are closed during speeds above idle to direct the exhaust gases overboard in an axial direction through an axially aligned rearwardly located exit opening of the exhaust nozzle.

1 Claim, 4 Drawing Figures

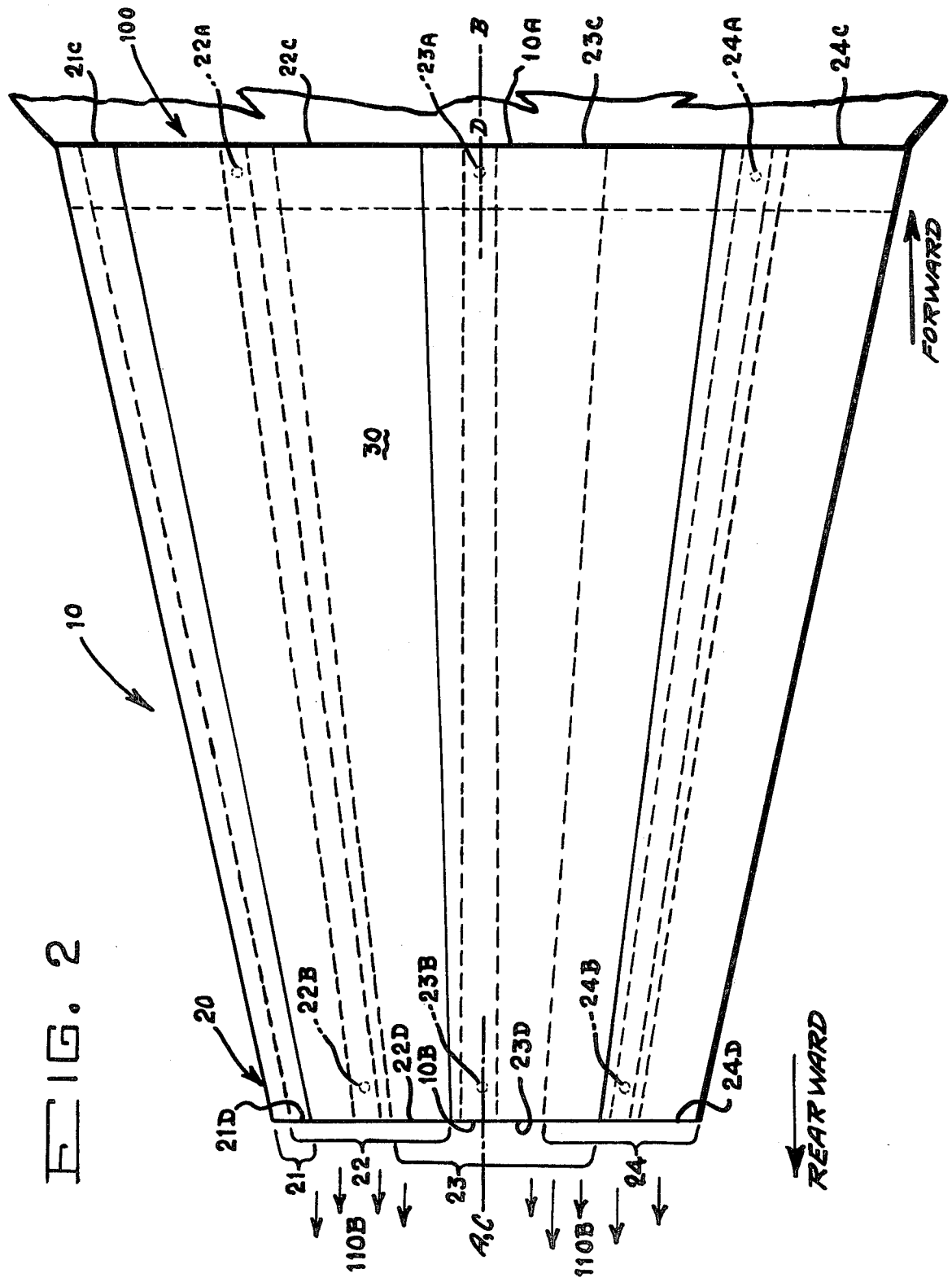

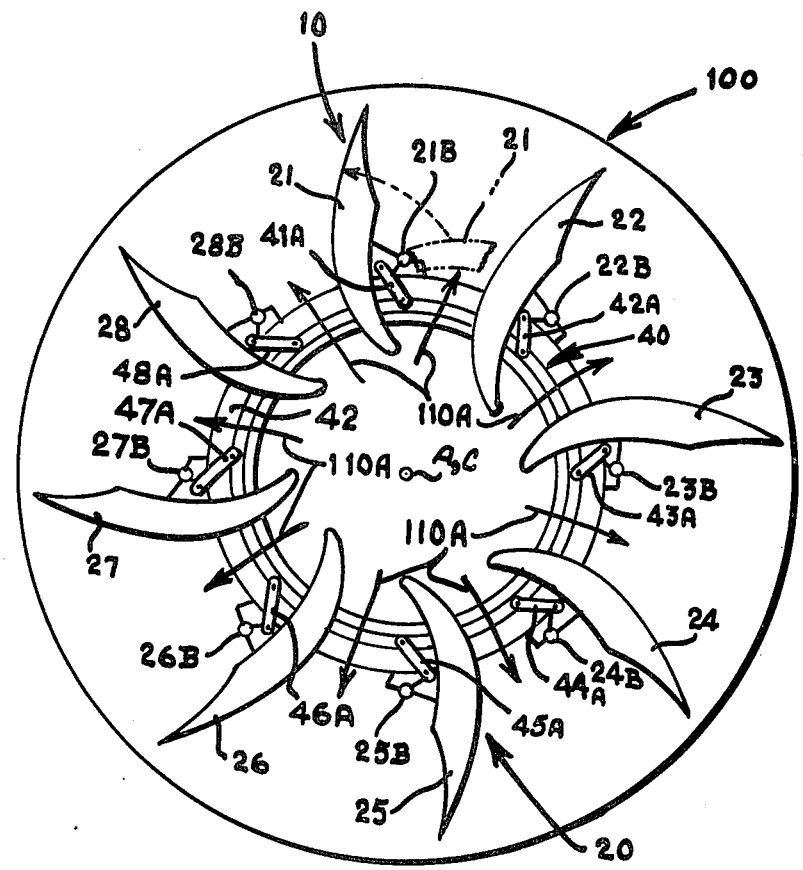
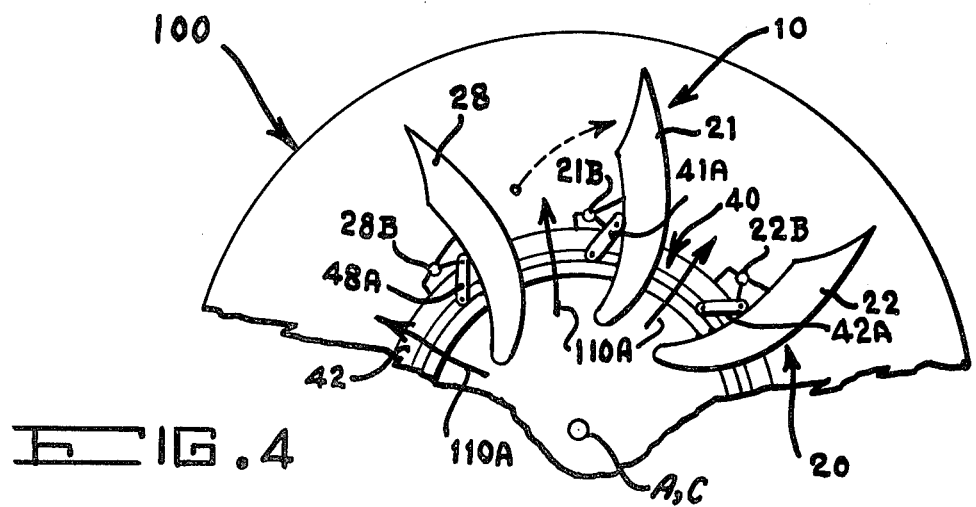

RADIAL AND AXIAL FLOW VARIABLE EXHAUST NOZZLE FOR A GAS TURBINE ENGINE

STATEMENT OF GOVERNMENT INTEREST

The invention described herein may be manufactured and used by or for the Government for governmental purposes without the payment of any royalty thereon.

BACKGROUND OF THE INVENTION

This invention relates to a unique structural means for, and a novel method of, providing minimum thrust at the idle power setting, and maximum thrust with minimum losses at higher power settings, for a gas turbine engine.

It is well known in the art that a gas turbine engine which can attain high thrust when at high power settings, will also have an undesirable high thrust when at the idle power setting. Accordingly, what is needed with regard to a gas turbine engine, and is not presently available, is a means for, and/or method of, providing minimum thrust at idle speed (i.e., idle power setting), while nevertheless still being capable of providing maximum power with minimum losses at speeds (i.e., power settings) above the idle speed.

With my invention, I am able to fulfill this current need; and, thereby, I have significantly advanced the state of the art.

SUMMARY OF THE INVENTION

My invention comprises a variable exhaust nozzle for a gas turbine engine, and a method of using the exhaust nozzle, to provide minimum thrust at idle speed, and maximum thrust at speeds higher than idle speed with minimum losses.

Therefore, the principal object of this invention is to teach the structure of a preferred embodiment of my unique exhaust nozzle and the steps of my novel method.

Another object of this invention is to dissipate gas turbine engine thrust in a controlled manner without inducing an unwanted torque to the engine.

These objects, as well as related objects, of this invention will become readily apparent after a consideration of the description of the invention, together with reference to the Figures of the drawings.

DESCRIPTION OF THE DRAWINGS

FIG. 2 is a side elevation view, in simplified pictorial form, partially fragmented, and not to scale of the inventive exhaust nozzle in its working environment in the "closed position";

FIG. 3 is a back view, in simplified pictorial and schematic form, of the inventive exhaust nozzle in its working environment in what will hereinafter be referred to as the "counterclockwise open position"; and FIG. 4 is a back view, in simplified pictorial and schematic form and partially fragmented, of the inventive exhaust nozzle in its working environment in what will hereinafter be referred to as the "clockwise open position".

Figure 1:
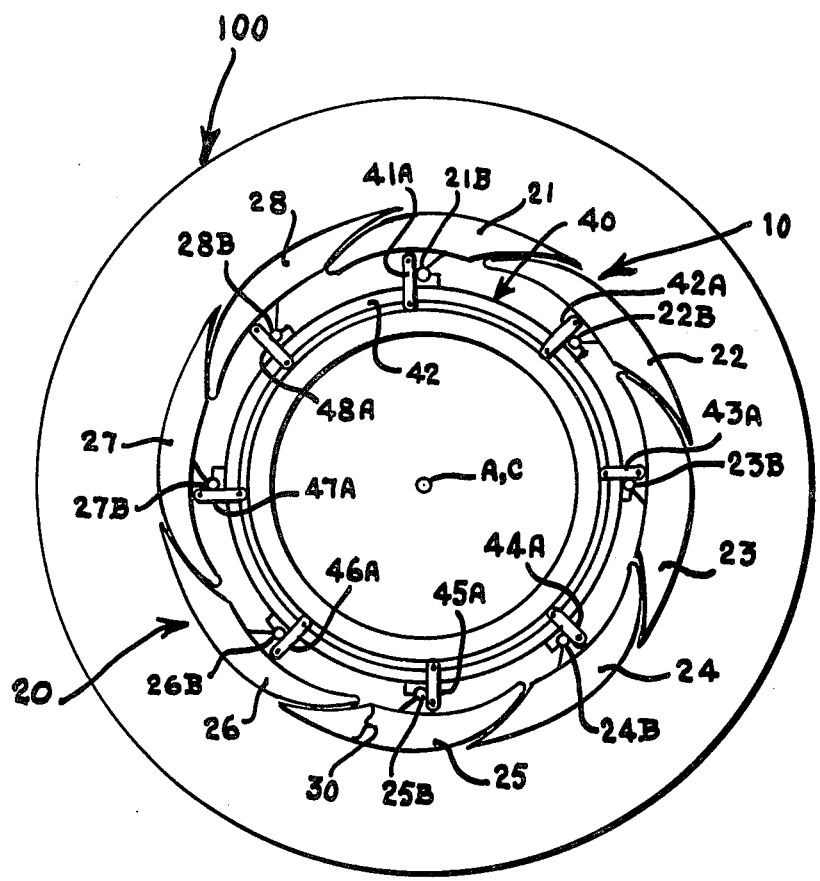
FIG. 1 is a back view, in simplified pictorial and schematic form, of a preferred embodiment of the inventive exhaust nozzle in its working environment in what will hereinafter be referred to as the "closed position"

It is to be noted that the Figures of the drawing show the result of practicing the steps of my inventive method, as will be described later herein.

DESCRIPTION OF THE PREFERRED EMBODIMENT

With reference to FIGS. 1-4, inclusive, therein is shown a preferred embodiment 10 of my inventive gas turbine engine exhaust nozzle in its working environment.

As a preliminary matter, it is to be noted and to be remembered that my inventive exhaust nozzle 10 is for use with a gas turbine engine (such as 100, FIGS. 1-4, inclusive) that is operable at idle speed (i.e., idle power setting) and also is operable at speeds (i.e., power settings) above idle speed; that generates exhaust gases (such as 110A, FIGS. 3 and 4, and 110B, FIG. 2) when operated, with these gases flowing into and out its associated exhaust nozzle 10; and that has a centrally located longitudinal axis (such as A-B, FIGS. 1-4, inclusive). It is also to be noted that my exhaust nozzle 10 has a centrally located longitudinal axis (such as C-D, FIGS. 1-4, inclusive) and that the gas turbine axis A-B and the exhaust nozzle axis C-D are coincident.

My inventive exhaust nozzle 10 comprises a plurality (such as is generally designated 20, FIGS. 1-4, inclusive) of adjacent, successively overlapping, pivotable, axially extending (i.e., extending axis-wise), aerodynamically configured members, i.e., fairings (such as 21-28, inclusive, FIGS. 1-4, inclusive) of finite length that are disposed so as to define an annular surface (such as is generally designated 30, FIGS. 1 and 2) which, in turn, forms the exhaust nozzle 10, and the axially aligned forewardly located throat (such as 10A, FIG. 2) of the exhaust nozzle, and the axially aligned rearwardly located exit opening, i.e., axial exhaust (such as 10B, FIG. 2) of the exhaust nozzle 10. Succinctly, the members (or fairings) form the exhaust nozzle 10, the exhaust nozzle throat 10A, and the exhaust nozzle rear exit opening 10B. The members (or fairings) 21-28 are preferably, but need not be, identical.

The members or fairings 21-28 of the plurality 20 are simultaneously, selectively, and variably, outwardly operable together (as shown in FIGS. 3 and 4), either counterclockwise (FIG. 3) or clockwise (FIG. 4). Likewise, they are simultaneously, selectively, and variably, inwardly closeable together (as shown in FIGS. 1 and 2) by reversing the opening direction. As a matter of preference, the opening and closing capability of the fairings 21-28 is by use of pivots (such as 21B-28B, inclusive, FIG. 1). In this regard, it is to be noted that also shown in FIGS. 1, 3 and 4 is a rudimentary preferred means (generally designated 40) for accomplishing the actual movement (i.e., not the pivoting itself) of the fairings 21-28 around the respective pivots 21B-28B. That means 40 includes a movable ring 42 to which are pivotally attached a plurality of suitably disposed links (such as 41A-48A) which, in turn, are ultimately and indirectly connected to the pivots 21B-28B. A rotation of the ring 42, in either direction, results in the eventual pivoting of the fairing 21-28 about their respective pivots 21B-28B. It is also to be noted that the means 40 for accomplishing the movement of the fairings 21-28 is not a part of this invention; and, that other suitable means, such as a spring force means, hydraulic power means, or other type of mechanical-type actuator means can be used to effectuate the movement.

More specifically, and with reference to FIG. 2, each member (or fairing) of the plurality 20 has a forward end edge (such as forward end edges 21C, 22C, 23C and 24C for, respectively, representative fairings 21, 22, 23 and 24) and a rearward end edge (such as rearward end edges 21D, 22D, 23D and 24D for, respectively, representative fairings 21, 22, 23 and 24), with each member (or fairing) of the plurality 20 having a pivot at or near its respective end edge (such as forward edge pivot 22A and rearward end edge pivot 22B for representative member or fairing 22; and, similarly, end edge pivots 23A and 23B, and 24A and 24B, for, respectively, representative members or fairings 23 and 24).

DESCRIPTION OF THE INVENTIVE METHOD

As a preliminary matter, reference is made to FIGS. 1-4, inclusive, which show the result of practicing the steps of my inventive method.

My method of providing minimum thrust at idle speed, and maximum thrust with minimum losses at speeds above idle speed, with a gas turbine engine (such as 100, FIGS. 1-4, inclusive) having an exhaust nozzle (such as 10, FIGS. 1-4), where the gas turbine engine 100 is operable at idle speed and also at speeds above idle speed, and where the gas turbine engine generates exhaust gases (such as 110A, FIGS. 3 and 4, and 110B, FIG. 2) whenever it is operated, with the exhaust gases 110A and 110B flowing into and out of the exhaust nozzle 10, and also where the gas turbine engine 100 and its exhaust nozzle 10 each has a centrally located longitudinal axis (such as A-B and C-D, FIG. 2) which are coincident, and further where the exhaust nozzle 10 comprises a plurality (such as is generally designated 20, FIGS. 1-4, inclusive) of adjacent, successively overlapping, pivotable, axially extending, aerodynamically configurated, and annularly disposed constituent members, or fairings (such as 21-28, FIGS. 1-4, inclusive), and where the exhaust nozzle 10 has an axially aligned rearwardly located exit opening (such as 10B, FIG. 2), comprises, essentially, two steps.

Assuming that the gas turbine engine 100 is being started, then the sequential steps are:

Firstly, pivoting the exhaust nozzle constituent members (or, fairings) 21-28 to an open position (such as is shown in FIGS. 3 and 4) during operation of the gas turbine engine 100 at idle speed (i.e., idle power setting), with the result that the exhaust gases 110A, FIGS. 3 and 4, formed (i.e., produced) by operating the gas turbine engine 100 flow overboard from the exhaust nozzle, between the opened members (i.e., through the openings formed by the opened members), in radial directions, as is shown in FIGS. 3 and 4; and Lastly, pivoting the exhaust nozzle constituent members (or fairings) 21-28 to a closed position (such as is shown in FIGS. 1 and 2) during operation of the gas turbine engine 100 at a speed (i.e., power setting) above idle speed (i.e., at a power setting above the idle power setting), with the result that the exhaust gases 110B, FIG. 2, formed (i.e., produced) by operating the gas turbine engine 100 flow overboard from the exhaust nozzle 10 in an axial direction through the axially aligned rearwardly located exit opening 10B of the exhaust nozzle 10, as is shown in FIG. 2.

Thereby, I provide minimum thrust at idle speed, and maximum thrust with minimum losses at speeds above idle speed, for the gas turbine engine 100.

MANNER OF OPERATION OF THE PREFERRED EMBODIMENT

The manner of operation, and of use, of the preferred embodiment 10, FIGS. 1-4, inclusive, can be easily ascertained by any person of ordinary skill in the art from the foregoing description, coupled with reference to the contents of the Figures of the drawings.

For others, it is sufficient to say that high thrust, while the gas turbine engine 100 is at idle, is not desired; that moving the nozzle-forming fairings 21-28 to the open position (FIGS. 3 and 4) prevents high thrust; and, that the manner of operation of my inventive nozzle 10 can be readily understood from a reading of the description of my inventive method.

CONCLUSION

It is abundantly clear from all of the foregoing, and from the Figures of the drawings, that the stated objects, as well as related objects, of my invention have been achieved.

It is to be noted that, although there have been described and shown the fundamental and unique features of my invention as applied to a preferred embodiment, various other embodiments, variations, adaptations, substitutions, additions, omissions, and the like, may occur to, and can be made by, those of ordinary skill in the art, without departing from the spirit of my invention. For example; (a) although eight constituent nozzle-forming members, or fairings, 21-28 are shown, the number thereof may be varied, so long as the annular surface 30 is formed; and (b) the exhaust nozzle 10 that is formed by members 21-28 may be configurated in a divergent shape, rather than the convergent shape that is best shown in FIG. 2, by suitably restructuring members 21-28.

Additionally, because of my teaching, it may occur to others of ordinary skill in the art that, in appropriate particular circumstances, the number of the basic and fundamental steps of my inventive method can be increased or otherwise varied. In this regard, it is to be noted that the same desired results will be obtained, nevertheless.

What is claimed is:

1. A method of providing minimum thrust at idle speed, and maximum thrust with minimum losses at speeds above idle speed, with a gas turbine engine having an exhaust nozzle, wherein said gas turbine engine is operable at idle speed and also at speeds above idle speed, and wherein said gas turbine engine generates exhaust gases whenever it is operated, with said exhaust gases flowing into and out of said exhaust nozzle, and also wherein said gas turbine engine and said exhaust nozzle each has a centrally located longitudinal axis which are coincident, and further wherein said exhaust nozzle comprises a plurality of adjacent, successively overlapping, pivotable, axially extending, aerodynamically configurated, and annularly disposed constituent members, and has an axially aligned rearwardly located exit opening, comprising the steps of:

a. pivoting said exhaust nozzle constituent members to an open position during operation of said gas turbine engine at idle speed, whereby said exhaust gases formed by said operating gas turbine engine flow overboard from said exhaust nozzle, between said opened members, in radial directions;

b. and, pivoting said exhaust nozzle constituent members to a closed position during operation of said gas turbine engine at a speed above idle speed, whereby said exhaust gases formed by said operating gas turbine engine flow overboard from said exhaust nozzle in an axial direction through said axially aligned rearwardly located exit opening of said exhaust nozzle.

* * * * *